(12) United States Patent
Cheng

(10) Patent No.: US 6,917,358 B2
(45) Date of Patent: Jul. 12, 2005

(54) RESISTANCE INDUCTING WIRE LAYOUT ON A TOUCH PANEL

(75) Inventor: David Cheng, Hsi-Chih (TW)

(73) Assignee: Onetouch Technologies Co., Ltd., Taipei Hsien (TW)

( * ) Notice: Subject to any disclaimer, the term of this patent is extended or adjusted under 35 U.S.C. 154(b) by 317 days.

(21) Appl. No.: 10/385,806

(22) Filed: Mar. 11, 2003

(65) Prior Publication Data

US 2004/0100455 A1 May 27, 2004

(30) Foreign Application Priority Data

Nov. 25, 2002 (TW) ........................................ 91218967 U

(51) Int. Cl.[7] .................................................. G09G 5/00
(52) U.S. Cl. ...................................... 345/173; 345/174
(58) Field of Search ................................ 345/173, 174; 178/18.01–18.04; 200/5 A, 512, 600

(56) References Cited

U.S. PATENT DOCUMENTS

| | | | |
|---|---|---|---|
| 6,380,497 B1 * | 4/2002 | Hashimoto et al. | 200/5 A |
| 6,611,257 B1 * | 8/2003 | Dotson et al. | 345/174 |
| 2003/0058225 A1 * | 3/2003 | Ksuda et al. | 345/173 |
| 2003/0071793 A1 * | 4/2003 | Carpenter et al. | 345/173 |
| 2003/0071797 A1 * | 4/2003 | Chang et al. | 345/173 |
| 2004/0085299 A1 * | 5/2004 | Huang et al. | 345/173 |

* cited by examiner

Primary Examiner—Amare Mengistu
(74) Attorney, Agent, or Firm—Quintero Law Office

(57) ABSTRACT

A resistance induction wire layout on a touch panel includes a substrate, a first resistance induction wire, a second resistance induction wire, a third resistance induction wire, a fourth resistance induction wire and a fifth resistance induction wire. The substrate has a first surface being coated with a conductive material. The first, the second, the third, the fourth and the fifth resistance induction wires are laid on the conductive material in a way of being arranged discontinuosly. When a voltage signal entering the touch panel from one of the four nodal points can be reached to each sector of the fifth resistance inducting wire via the first, the second, the third and the fourth resistance inducting wires such that each of the sectors can acquire a consistent voltage value.

8 Claims, 2 Drawing Sheets

RESISTANCE INDUCTING WIRE LAYOUT ON A TOUCH PANEL

BACKGROUND OF THE INVENTION

1. Field of the Invention

The present invention relates to a touch panel and, particularly, to a resistance inducting wire on a touch panel, with which a plurality of resistance inducting wires are laid on a surface of the touch panel and one of the resistance inducting wires has sectors smaller than those in rest of the resistance inducting wires so that the sectors can provide a voltage with the same value to enhance the accuracy of inducting the motion of an object on the touch panel.

2. Description of Related Art

The conventional resistance inducting wire layout on a touch panel usually includes a substrate with at least a resistance inducting wire (Mostly three or four resistance inducting wires are frequently seen in the market.) being etched on the substrate. Due to the resistance inducting wires having an independent route thereof with an individual impedance different from each other, the sectors of the innermost resistance inducting wire are induced different voltage values with different induced timings so that it is not possible for the touch panel to sense the motion of an object accurately.

For instance, the U.S. Pat. No. 4,622,437, which was grated to Bloom et al on Nov. 11, 1984 and entitled: METHOD AND APPARATUS FOR IMPROVED ELECTRONIC TOUCH MAPPING, disclosed a method and an apparatus for increasing percentage of the available area on a touch panel. The prior art includes an electrode component connected to an electrical conductive layer, which has a known space impedance characteristic. Bloom et al. provide a touch panel with an upgraded electrode structure and an interface component between the electrode and impedance layer. Hence, Bloom et al. has contributed the touch panel with a more linear mapping function in an expansive touch-induction area of the impedance layer.

Further, another example is the U.S. Pat. No. 5,045,644, which has been grated to Dunthorn on Sep. 13, 1991 and entitled: TOUCH SENSITIVE SCREEN WITH IMPROVED CORNER RESPONSE. Dunthorn has provided a simplified structure of electrical drafting touch inductor, which has an increased area for linear output signal. A resistance layer with virtually homogeneous resistance output and a resistor part with resistance margin is connected to the resistance layer. A plurality of insulation areas are placed properly along a selected route nearest the resistor part and each of the insulation areas has a selected effective length respectively to define a clearance between any two of the selected effective lengths. The respective clearance has a resistance layer therein and a voltage is added to the resistance layer from resistor part with resistance margin to define a resistance electrode component such that an orthogonal electric field can be generated in the resistance layer. Both the effective lengths and the clearances of the insulation areas can be urged to produce a voltage gradient along the route selectively to compensate any voltage drop of the resistor part significantly during the orthogonal electrical field being formed.

However, the conventional art and the preceding U.S. Patents do not mention how to print the resistance layer to the glass substrate instead of the process of etching and how to sense the motion of an object on a touch panel more accurately. Therefore, each sector of the resistance inducting wire being capable of obtaining a consistent voltage value without the process of etching is urgently needed so as to enhance the accuracy of the touch panel for sensing the motion of an object.

SUMMARY OF THE INVENTION

The crux of the present invention is to provide a resistance inducting wire layout on a touch panel, with which a plurality of resistance inducting wires are laid on a surface of the touch panel and one of the resistance inducting wires has sectors smaller than those in rest of the resistance inducting wires so that the sectors can provide a voltage with the same value to enhance the accuracy of inducting the motion of an object on the touch panel.

Accordingly, a resistance induction wire layout on a touch panel according to the present includes a substrate, a first resistance induction wire, a second resistance induction wire, a third resistance induction wire, a fourth resistance induction wire and a fifth resistance induction wire. The substrate has a first surface being coated with a conductive material. The first, the second, the third, the fourth and the fifth resistance induction wires are laid on the conductive material in a way of being arranged discontinuously. The first resistance induction wire provides four nodal points at the periphery of the first surface for being added with a voltage or grounded. The second resistance induction wire is disposed next to the inner side of the first resistance induction wire and has a route meeting the first resistance induction wire. The third resistance induction wire is disposed next to the inner side of the second resistance induction wire and has a route meeting the second resistance induction wire. The fourth resistance induction wire is disposed next to the inner side of the third resistance induction wire and has a route meeting the third resistance induction wire. The fifth resistance induction wire is disposed next to the inner side of the fourth resistance induction wire and has at least twenty-five sectors with each of the sectors being not necessarily consistent in length thereof. When a voltage signal entering the touch panel from one of the four nodal points can be reached to each sector of the fifth resistance inducting wire via the first, the second, the third and the fourth resistance inducting wires such that each of the sectors can acquire an identical value of voltage.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
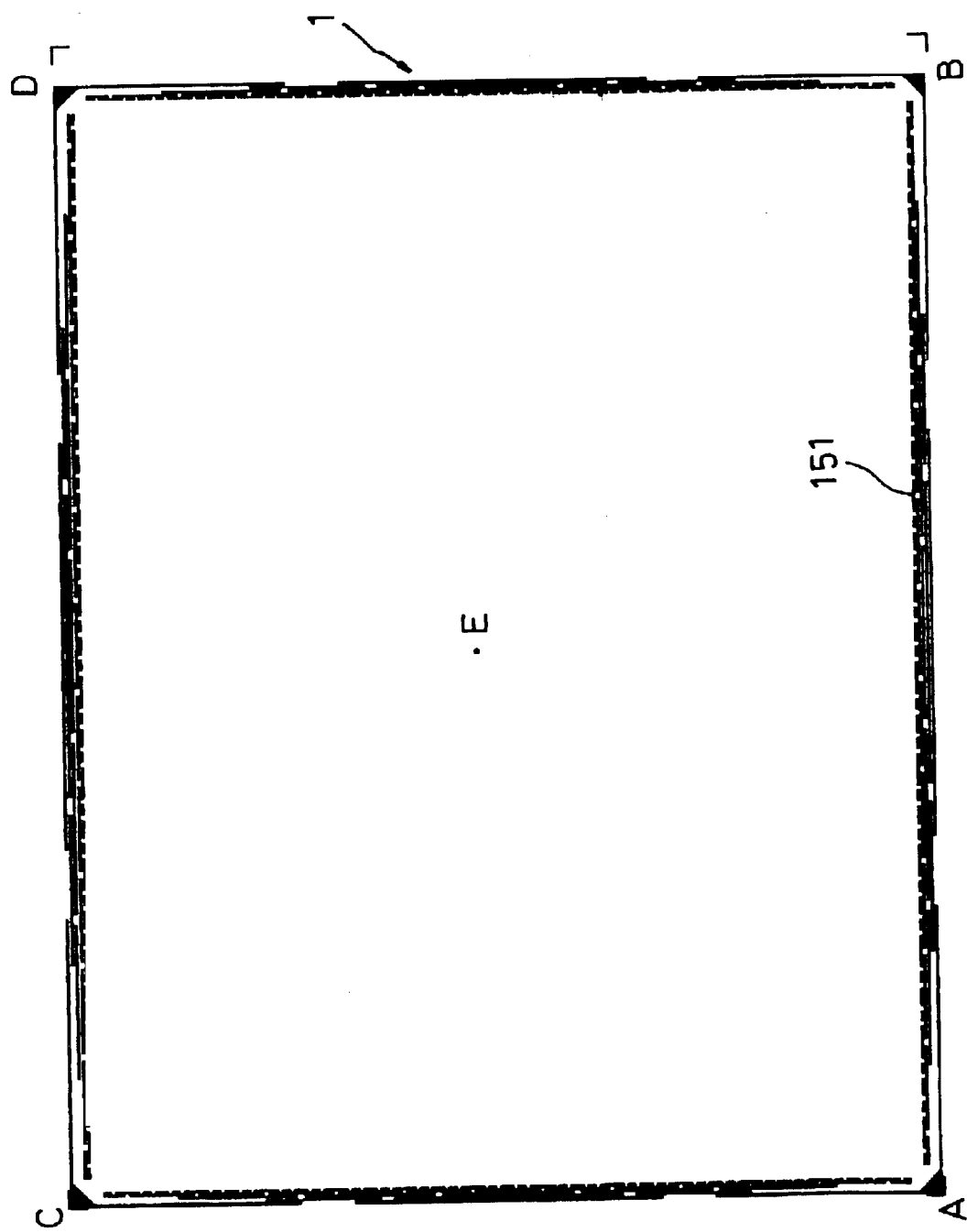
FIG. 1 is a plan view of a resistance inducting wire layout on a touch panel according to the present invention.

Referring to FIG. 1, a plan view of a resistance inducting wire layout on a touch panel according to the present invention is illustrated. The resistance inducting wire layout of the present invention includes a substrate 1, a first resistance inducting wire 11, a second wire 12, a third resistance inducting wire 13, a fourth resistance inducting wire 14 and fifth resistance inducting wire 15.

Wherein, the substrate 1 is used for transmitting induced voltage and at a first surface thereof is coated with a conductive material preferably by way of plating or printing.

The conductive material is transparent to be available for being observed by so that it preferably is indium tin oxide (ITO), tin antimony oxide (TAO) or other metal oxides. The first resistance inducting wire 11 is laid on the conductive material in a way of being arranged discontinuously with the first surface being provided with four nodal points A, B, C and D at the periphery thereof for being added with a voltage or grounded. The second resistance inducting wire 11 is disposed next to the inner side of the first resistance inducting wire 11 in a way of being arranged discontinuously. The second resistance inducting wire 12 has a route to meet the first resistance inducting wire 11. The third resistance inducting wire 13 is disposed next to the inner side of the second resistance inducting wire 12 in a way of being arranged discontinuously with a route meeting the second resistance inducting wire 12. The fourth resistance inducting wire 14 is disposed next to the inner side of the second resistance inducting wire 12 in a way of being arranged discontinuously with a route meeting the third resistance inducting wire 13. The fifth resistance inducting wire 15 is disposed next to the inner side of the fourth resistance inducting wire 14 in a way of being arranged discontinuously. The fifth resistance inducting wire 15 at least has twenty-five sectors 151 and each sector 151 does not have to provide an identical length. Thus, the voltage entering the touch panel from one of the four nodal points A, B, C and D can be reached to each sector 151 of the fifth resistance inducting wire 15 via the first resistance inducting wire 11, the second resistance inducting wire 12, the third resistance inducting wire 13 and the fourth resistance inducting wire 14 simultaneously such that each of the sectors 151 has a voltage with an identical value.

Figure 2:
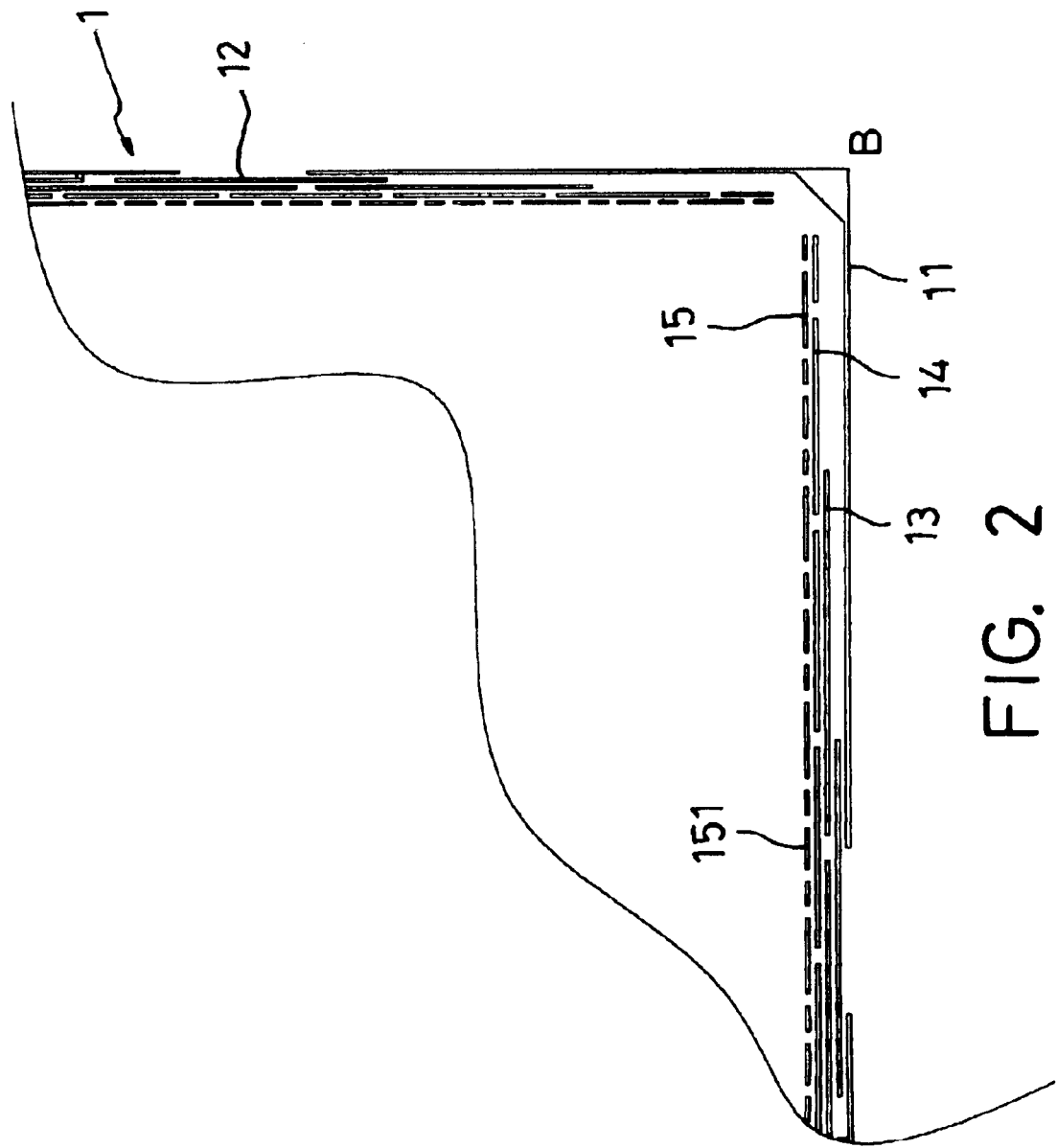
FIG. 2 is a fragmentary enlarged plan view of the wire layout on a touch panel shown in FIG. 1.

The present invention can be operated with a principle described hereinafter. If the substrate 1 is touched by the user at a certain point E, the nodal points A and B can be added with a voltage +5V and the nodal points C and D are grounded in case of the point E being induced a voltage along X coordinate, i.e., along AB direction. Then, the voltage along X coordinate can be induced at the point E. Next, the nodal points A and C can be added with a voltage +5V and the nodal points B and D are grounded in case of the point E being induced a voltage along Y coordinate, i.e., along AC direction. In this way, the voltage along Y coordinate can be induced at the point E. In case of point E being not touched by any object, Once point E has been touched with an object, point E can touch nodal points A, B, C and D and the voltages along X and Y coordinates can be induced with point E. If point E is not touched with an object, point E does not touch nodal points A, B, C and D so that no voltage at point E is output. The resistance inducting wire layout of the present invention is different from the prior art in that the voltage from the nodal point A, B, C or D can be transmitted to the second resistant inducting wire 12 via the transparent indium tin oxide (ITO), tin antimony oxide (TAO) or any other metal oxide and silver plasma, copper plasma or any other conductive plasma after being transmitted to the first resistance inducting wire (the current can be flowed to all over the first resistance inducting wire 11). Wherein, the conductivity of the metal oxide is lower than that of the conductive plasma so that the transmission speed of the metal oxide lower than that of the conductive plasma. By the same token, the voltage in the third resistance inducting wire 13 can be transmitted to the fourth resistance inducting wire 14 via different routes after passing through the transparent metal oxide or the conductive plasma. The voltage further can be transmitted to each of the sectors 151 of the fifth resistance inducting wire 15 via the metal oxide. FIG. 2 shows the voltage signal can simultaneously reach each of the sectors 151 of the fifth resistance inducting wire 15 via all the resistance inducting wires. Hence, each of the sectors 151 has a consistent voltage value so that it is not possible to occur potential difference during the voltages along X and Y coordinates being induced and the induced voltage at point E is naturally much more accurate than the prior art.

Referring to FIG. 2, an enlarged fragmentary view showing the resistance inducting wire for a touch panel is illustrated. It can be seen that the fifth resistance inducting wire 15 is provided with at least twenty-five sectors 151 and it is not necessary for each of the sectors 151 to have a consistent length. Hence, a voltage signal entering the touch panel from one of the four nodal points A, B, C and D can be reached to each sector 151 of the fifth resistance inducting wire 15 via the first resistance inducting wire 11, the second resistance inducting wire 12, the third resistance inducting wire 13 and the fourth resistance inducting wire 14 simultaneously such that each of the sectors 151 has a consistent voltage value.

It is appreciated that the resistance inducting wire layout on a touch panel of the present invention allows each sector of the last resistance inducting wire has the same voltage and no potential difference occurs during the voltage on X and Y coordinates being induced. Hence, the voltage output induced with the present invention can be much more accurate than the prior art naturally. Moreover, the resistance inducting wires of the present invention are printed to the substrate instead of being made with etching, which is usually used in the prior art so that the fabrication cost and time for a touch panel with the resistance inducting wire layout of the present invention are much more economical.

While the invention has been described with reference to the a preferred embodiment thereof, it is to be understood that modifications or variations may be easily made without departing from the spirit of this invention, which is defined by the appended claims.

What is claimed is:

1. A resistance inducting wire layout on a touch panel, comprising:
   a substrate, having a first surface being coated with a conductive material;
   a first resistance induction wire, being laid on the conductive material in a way of being arranged discontinuously and providing four nodal points at a periphery of the first surface for being added with a voltage or grounded;
   a second resistance induction wire, being disposed next to an inner side of the first resistance induction wire in way of being arranged discontinuously and having a route meeting the first resistance induction wire;
   a third resistance induction wire, being disposed next to an inner side of the second resistance induction wire in a way of being arranged discontinuously and having a route meeting the second resistance induction wire;
   a fourth resistance induction wire, being disposed next to an inner side of the third resistance induction wire in a way of being arranged discontinuously and having a route meeting the third resistance induction wire; and
   a fifth resistance induction wire, being disposed next to an inner side of the fourth resistance induction wire in a way of being arranged discontinuously and having at least twenty-five sectors with each of the sectors being not necessarily consistent in length thereof;
   whereby, a voltage signal entering the touch panel from one of the four nodal points can be reached to each sector of the fifth resistance inducting wire via the first resistance induction wire, the second resistance induction wire, the third resistance induction wire and the fourth resistance inducting wire simultaneously such that each of the sectors can acquire an identical value of voltage.

2. The resistance inducting wire layout on a touch panel as defined in claim 1, wherein the substrate is made of glass.

3. The resistance inducting wire layout on a touch panel as defined in claim 1, wherein the conductive material is transparent and preferably made of indium tin oxide (ITO), tin antimony oxide (TAO) or any other metal oxide.

4. The resistance inducting wire layout on a touch panel as defined in claim 1, wherein the coating is done with printing.

5. The resistance inducting wire layout on a touch panel as defined in claim 1, wherein the coating is done with plating.

6. The resistance inducting wire layout on a touch panel as defined in claim 1, wherein the first, the second, the third, the fourth and the fifth resistance induction wires are made of silver plasma, copper plasma or any other conductive plasma.

7. The resistance inducting wire layout on a touch panel as defined in claim 6, wherein the first, the second, the third, the fourth and the fifth resistance induction wire are attached to the conductive material by way of printing.

8. The resistance inducting wire layout on a touch panel as defined in claim 6, wherein the first, the second, the third, the fourth and the fifth resistance induction wire are attached to the conductive material by way of plating.

* * * * *